United States Patent
Miyagawa et al.

[11] Patent Number: 6,025,043
[45] Date of Patent: Feb. 15, 2000

[54] JOINT BOOT OBTAINED FROM CHLOROSULFONATED ETHYLENE-ALPHA-OLEFIN COPOLYMER COMPOSITION

[75] Inventors: Yasumichi Miyagawa; Mitsuhiro Kamezawa; Hideyoshi Nakamura; Masahiro Watanuki, all of Yamaguchi, Japan

[73] Assignee: Tosoh Corporation, Yamaguchi, Japan

[21] Appl. No.: 09/267,358

[22] Filed: Mar. 15, 1999

Related U.S. Application Data

[62] Division of application No. 08/722,560, Sep. 27, 1996, Pat. No. 5,916,977.

[30] Foreign Application Priority Data

Sep. 29, 1995 [JP] Japan .................................. 7-252569

[51] Int. Cl.⁷ ................. F16D 3/84; C08K 5/40
[52] U.S. Cl. .................. 428/36.8; 428/35.7; 428/36.9; 464/170; 464/173; 464/175; 277/634; 277/636; 277/650
[58] Field of Search ................. 428/35.7, 36.8, 428/36.9; 464/170, 173, 175; 277/634, 636, 650, 944

[56] References Cited

U.S. PATENT DOCUMENTS

| | | |
|---|---|---|
| 2,530,769 | 11/1950 | Hollis . |
| 4,342,851 | 8/1982 | Suzui et al. . |
| 4,786,665 | 11/1988 | Nakagawa et al. . |
| 5,230,936 | 7/1993 | Misumi et al. ................. 428/36.9 X |

FOREIGN PATENT DOCUMENTS

| | | |
|---|---|---|
| 701106 | 1/1965 | Canada . |
| 3-328848 | 2/1995 | Germany . |
| 6-443549 | 2/1989 | Japan . |
| 6-448843 | 2/1989 | Japan . |
| 1-210443 | 8/1989 | Japan . |
| 3-100035 | 4/1991 | Japan . |
| 3-139544 | 6/1991 | Japan . |
| 3-143939 | 6/1991 | Japan . |

OTHER PUBLICATIONS

Patent Abstracts of Japan, vol. 018, No. 462 (C–1243), Aug. 29, 1994.
Patent Abstracts of Japan vol. 015, No. 202 (C0834), May 23, 1991.
Database WPI, Section Ch, Week 9116, Derwent Publications Ltd., London, GB Class A17, AN 91–114485.
Database WPI, Section Ch, Week 9521, Derwent Publications Ltd., London, GB Class A17, AN 95–157600.

*Primary Examiner*—Fred Teskin
*Attorney, Agent, or Firm*—Sughrue, Mion, Zinn, Macpeak & Seas, PLLC

[57] ABSTRACT

A chlorosulfonated ethylene-α-olefin copolymer composition comprising a chlorosulfonated ethylene-α-olefin copolymer, a thiuram compound, a bismaleimide compound, a nickel dialkyldithiocarbamate, and a diarylmonoamine compound, and a motorcar joint boot obtained by molding and vulcanizing the chlorosulfonated ethylene-α-olefin copolymer composition. The copolymer composition is excellent in the tensile characteristics at room temperature and low temperature, in the compression set under a low-temperature atmosphere, and in the fatigue resistance.

20 Claims, 1 Drawing Sheet

FIG. 1

JOINT BOOT OBTAINED FROM CHLOROSULFONATED ETHYLENE-ALPHA-OLEFIN COPOLYMER COMPOSITION

This is a divisional of application Ser. No. 08/722,560 filed Sep. 27, 1996, now U.S. Pat. No. 5,916,977, the disclosure of which is incorporated herein by reference.

FIELD OF THE INVENTION

The present invention relates to a chlorosulfonated ethylene-α-olefin copolymer composition excellent in tensile characteristics at room temperature and low temperature, and compression set under a low-temperature atmosphere and fatigue resistance, and also to a joint boot using the composition.

BACKGROUND OF THE INVENTION

Since a chlorosulfonated ethylene-α-olefin copolymer is excellent in dynamic characteristics and low-temperature resistance as compared with chlorosulfonated polyethylene using a high-density polyethylene, the application of the copolymer to dynamic uses such as motorcar belts, etc., has been investigated.

One example of the dynamic uses to which the application of the chlorosulfonated ethylene-α-olefin composition has been investigated is joint boots for motorcars. For example, a uniform joint for smoothly transmitting rotation between the shaft of the driving shaft and the shaft of the side being driven is provided to a drive shaft of a front-wheel-drive car, and a uniform joint boot for enclosing a grease in the inside thereof is mounted in the form of covering the portion.

Hitherto, as the material for the joint boot, a chloroprene rubber has been used. However, with increase of the performance and improvement of the durability of recent motorcars, higher durability is required for the joint boot. In particular, since there is a limit about ozone resistance and heat resistance of a chloroprene rubber, a material more excellent in the ozone resistance and the heat resistance has been demanded. For this purpose, recently, an attempt of using a chlorosulfonated ethylene-α-olefin copolymer more excellent in the ozone resistance and the heat resistance than the chloroprene rubber as the material for a joint boot has been investigated.

For obtaining a vulcanization property suitable for each use, the chlorosulfonated ethylene-α-olefin composition is usually used as a composition thereof with various kinds of additives such as a vulcanizing agent, a vulcanization aid, a vulcanization accelerator, a reinforcing agent, a plasticizer, a processing aid, an antioxidant, etc. JP-A-1-210443 (the term "JP-A" as used herein means an "unexamined published Japanese patent application") discloses a chlorosulfonated ethylene-α-olefin copolymer composition which is excellent in the heat resistance, the cold resistance, and the water resistance, and is useful in the field of rubber belts, prepared by compounding 100 parts by weight of a chlorosulfonated ethylene-α-olefin composition containing from 25 to 32% by weight of chlorine and from 0.3 to 2.5% by weight of sulfur with from 10 to 35 parts by weight of hydrotalcites, from 0.5 to 5 parts by weight of thiurams, from 0.5 to 5 parts by weight of maleimides, and from 0.2 to 4 parts by weight of dithiocarbamates.

However, a joint boot is a part which receives repeatedly a relatively large deformation under use conditions as compared with a rubber belt. Thus the joint boot is required to have a fatigue resistance capable of enduring the repeated deformation. Also, supposing the use in a cold district, the joint boot is required to have tensile characteristics capable of enduring a large deformation at low temperature. Further, the joint boot using the chlorosulfonated ethylene-α-olefin copolymer composition as proposed in JP-A-1-210443 described above is yet insufficient in the tensile characteristics and the fatigue resistance at low temperature. Therefore, the joint boot has not yet practically be used at present.

SUMMARY OF THE INVENTION

The present invention has been made to overcome the problems described above.

One object of the present invention is to provide a chlorosulfonated ethylene-α-olefin copolymer composition excellent in the tensile characteristics at room temperature and low temperature and also excellent in the compression set under a low-temperature atmosphere and the fatigue resistance.

Another object of the present invention is to provide a joint boot using the chlorosulfonated ethylene-α-olefin copolymer composition.

As a result of various investigations to attain the objects described above, it has been found that the above-described objects can be attained by compounding a specific chlorosulfonated ethylene-α-olefin with a specific vulcanization system. The present invention has been completed based on this finding.

One embodiment of the present invention is a chlorosulfonated ethylene-α-olefin copolymer composition comprising 100 parts by weight of a chlorosulfonated ethylene-α-olefin copolymer, from 0.05 to 3 parts by weight of a thiuram compound, from 0.5 to 5 parts by weight of a bismaleimide compound, from 0.1 to 5 parts by weight of a nickel dialkyldithiocarbamate, and from 0.5 to 10 parts by weight of a diarylmonoamine compound.

Another embodiment of the present invention is a joint boot prepared by molding and vulcanizing the composition described above.

A further embodiment of the present invention is joint boot obtained by molding and vulcanizing a chlorosulfonated ethylene-α-olefin copolymer composition comprising 100 parts by weight of a chlorosulfonated ethylene-α-olefin copolymer containing from 20 to 30% by weight of chlorine and from 0.3 to 2.0% by weight of sulfur obtained by chlorosulfonating an ethylene-α-olefin copolymer having a density of 0.88 g/cc or less, from 0.05 to 3 parts by weight of a thiuram compound, from 0.5 to 5 parts by weight of a bismaleimide compound, and from 0.1 to 5 parts by weight of a nickel dialkyldithiocarbamate.

DETAILED DESCRIPTION OF THE INVENTION

The present invention is described in more detail below.

The chlorosulfonated ethylene-α-olefin copolymer composition of the present invention comprises 100 parts by weight of a chlorosulfonated ethylene-α-olefin copolymer; from 0.05 to 3 parts by weight of a thiuram compound; from 0.5 to 5 parts by weight of a bismaleimide compound; from 0.1 to 5 parts by weight of a nickel dialkyldithiocarbamate; and from 0.5 to 10 parts by weight of a diarylmonoamine compound.

The chlorosulfonated ethylene-α-olefin copolymer which can be used in the present invention is not particularly limited so long as the copolymer is a chlorosulfonated ethylene-α-olefin copolymer obtained by chlorinating and chlorosulfonating an ethylene-α-olefin copolymer which is a raw material. Examples of the copolymer include chlorosulfonated polyethylene, a chlorosulfonated ethylene-propylene copolymer, a chlorosulfonated ethylene-butene-1 copolymer, a chlorosulfonated ethylene-hexene-1 copolymer, a chlorosulfonated ethylene-octene-1 copolymer, and chlorosulfonated ethylene-4-methylpentene-1. To obtain appropriate vulcanizing property and workability, it is preferred that a Mooney viscosity [$ML_{1+4}(100°\ C.)$] of the chlorosulfonated ethylene-α-olefin copolymer be in the range of from 10 to 150.

The chlorine content in the chlorosulfonated ethylene-α-olefin copolymer is preferably from 20 to 35% by weight for maintaining a polarity and a grease resistance of the polymer and for obtaining desired low-temperature characteristics by maintaining its glass transition point, and is more preferably from 25 to 32% by weight for improving a balance between the oil resistance and the low-temperature characteristics.

The sulfur content in the chlorosulfonated ethylene-α-olefin copolymer is the measure for the amount of a chlorosulfone group which becomes the crosslinking point of the chlorosulfonated ethylene-α-olefin copolymer. The sulfur content is preferably from 0.3 to 2.0% by weight for obtaining a practically proper vulcanized product, and is more preferably from 0.4 to 1.5% by weight for obtaining appropriate vulcanization property and fatigue resistance.

The chlorosulfonated ethylene-α-olefin copolymer of the present invention is obtained by chlorosulfonating an ethylene-α-olefin copolymer such as an ethylene-butene-1 copolymer, an ethylene-propylene copolymer, an ethylene-hexene-1 copolymer, an ethylene-octene-1 copolymer, an ethylene-4-methylpentene-1 copolymer, etc., by the conventional method as described in, for example, JP-B-62-58610 (the term "JP-B" as used herein means an "examined published Japanese patent application").

The thiuram compound which can be used in the present invention is not particularly limited so long as the compound has a thiuram structure in the molecule. Examples of the thiuram compound include tetramethylthiuram disulfide, tetraethylthiuram disulfide, and dipentamethylenethiuram tetrasulfide. Of those, dipentamethylenethiuram tetrasulfide is particularly preferred for obtaining a processing stability, an appropriate vulcanizing rate, and appropriate vulcanization properties. The amount of the thiuram compound added is from 0.05 to 3 parts by weight per 100 parts by weight of the chlorosulfonated ethylene-α-olefin copolymer, and is preferably from 0.1 to 2 parts by weight for obtaining the preferred vulcanization property and fatigue resistance. If the amount of the thiuram compound is less than 0.05 part by weight, the elongation of the vulcanized product is greatly decreased, while if the amount of the thiuram compound is over 3 parts by weight, the heat resistance and the compression set by heat aging are poor.

The bismaleimide compound which can be used in the present invention is not particularly limited so long as the compound has two maleimide structures in the molecule. Examples of the bismaleimide compound include N,N'-m-phenylenebismaleimide, N,N'-ethylenebismaleimide, and N,N'-propylenebismaleimide. Of these, N,N'-m-phenylenebismaleimide is particularly preferred for obtaining an appropriate vulcanizing rate and appropriate vulcanization properties.

The amount of the bismaleimide compound added is from 0.5 to 5 parts by weight per 100 parts by weight of the chlorosulfonated ethylene-α-olefin copolymer, and is preferably from 1 to 3 parts by weight for obtaining appropriate vulcanization properties and fatigue resistance. If the amount of the bismaleimide compound is less than 0.5 part by weight, the heat resistance and the compression set by heat aging are poor, while if the amount of the bismaleimide compound is over 5 parts by weight, the elongation of the vulcanized product is greatly decreased.

The nickel dialkyldithiocarbamate which can be used in the present invention is not particularly limited so long as the compound is a nickel salt of dithiocarbamate. Examples of the nickel dialkyldithiocarbamate include nickel diethyl dithiocarbamate and nickel dibutyldithiocarbamate. Of those, nickel dibutyldithiocarbamate is particularly preferred for obtaining appropriate vulcanization rate and vulcanization properties.

The amount of the nickel dialkyldithiocarbamate added is from 0.1 to 5 parts by weight per 100 parts by weight of the chlorosulfonated ethylene-α-olefin compound, and is preferably from 0.3 to 4 parts by weight for obtaining appropriate vulcanization properties and fatigue resistance. If the amount of the nickel dialkyldithiocarbamate is less than 0.1 part by weight, the compression set by heat aging is poor, while if the amount of the nickel dialkyldithiocarbamate is over 5 parts by weight, the breaking elongation at room temperature and low temperature is decreased.

The diarylmonoamine compound which can be used in the present invention is not particularly limited so long as the compound is a monoamine compound having two aromatic rings such as benzene rings, naphthalene rings, etc., bonded to the nitrogen atom. Examples of the diarylmonoamine compound include phenyl-α-naphthylamine, 4,4'-(α,α-dimethylbenzyl-diphenylamine), and octylated diphenylamine.

The amount of the diarylmonoamine compound added is from 0.5 to 10 parts by weight per 100 parts by weight of the chlorosulfonated ethylene-α-olefin composition. If the amount of the diarylmonoamine compound is less than 0.5 part by weight, the improvement of the low-temperature breaking elongation is small, while if the amount of the diarylmonoamine compound is over 10 parts by weight, vulcanization may be hindered.

The chlorosulfonated ethylene-α-olefin copolymer composition of the present invention comprises 100 parts by weight of the chorosulfonated ethylene-α-olefin copolymer, from 0.05 to 3 parts by weight of the thiuram compound, from 0.5 to 5 parts by weight of the bismaleimide compound, from 0.1 to 5 parts by weight of the nickel dialkyldithiocarbamate, and from 0.5 to 10 parts by weight of the diarylmonoamine compound, as described above, and further comprises from 1 to 20 parts by weight, per 100 parts by weight of the chlorosulfonated ethylene-α-olefin copolymer, of an alkylnaphthalene condensate wherein an alkyl chain has at least two carbon atoms.

It is already known that the fatigue resistance is improved by adding an alkylnaphthalene condensate wherein the alkyl chain has at least two carbon atoms to a chlorosulfonated polyolefin copolymer, as disclosed in JP-A-3-56548. In the present invention, by adding the alkylnaphthalene condensate wherein the alkyl chain has at least two carbon atoms to the composition of the present invention, the fatigue resistance is improved and at the same time the breaking elongation at low temperature is also improved.

The amount of the condensate added is preferably from 1 to 20 parts by weight per 100 parts of the chlorosulfonated ethylene-α-olefin copolymer for sufficiently attaining the effects and maintaining the hardness and the modulus of the vulcanized product, and is more preferably from 3 to 15 parts by weight for obtaining appropriate vulcanization properties and fatigue resistance.

The alkylnaphthalene condensate wherein the alkyl chain has at least two carbon atoms, which can be used in the present invention is not particularly limited so long as the condensate is a methylene condensate of a mono- or poly-alkylnaphthalene wherein the alkyl chain has at least two carbon atoms. Examples of the condensate include an ethylenenaphthalene condensate, an n-propylnaphthalene condensate, an isopropylnaphthalene condensate, a butylnaphthalene condensate, an isobutylnaphthalene condensate, a diethylnaphthalene condensate, a di-n-propylnaphthalene condensate, a diisopropylnaphthalene condensate, a dibutylnaphthalene condensate, and a diisobutylnaphthalene condensate.

If required and necessary, the chlorosulfonated ethylene-α-olefin copolymer composition of the present invention may further contain an acid acceptor, a reinforcing agent, a filler, a processing aid, a softening agent, a plasticizer, an antioxidant, etc.

Examples of the acid acceptor include metal oxides such as magnesium oxide, calcium oxide, or lead oxide; metal hydroxides such as calcium hydroxide; hydrotalcite; and a hydrotalcite burned product.

Examples of the reinforcing agent and the filler include carbon black, white carbon, calcium carbonate, clay, and talc.

Examples of the processing aid include low-molecular weight polyethylene and a metal soap.

Examples of the softening agent and the plasticizer include various kinds of oils, esters, and chlorinated paraffin.

Examples of the antioxidant include amine antioxidants (excluding diarylmonoamine compounds) and phenolic antioxidants.

By molding and vulcanizing the chlorosulfonated ethylene-α-olefin copolymer composition of the present invention, not only joint boots but also various kinds of belts and air springs can be obtained.

The method of molding and vulcanizing the chlorosulfonated ethylene-α-olefin copolymer composition is not particularly limited, and the conventional method can be used. For example, joint boots are produced by molding and vulcanizing the chlorosulfonated ethylene-α-olefin copolymer composition by an injection molding vulcanization method, a transfer molding vulcanization method, etc.

On the other hand, when the density of the ethylene-α-olefin copolymer which is the raw material of the chlorosulfonated ethylene-α-olefin copolymer is 0.88 g/cc or less, the composition comprising 100 parts by weight of the chlorosulfonated ethylene-α-olefin copolymer, from 0.05 to 3 parts by weight of the thiuram compound, from 0.5 to 5 parts by weight of the bismaleimide compound, and 0.1 to 5 parts by weight of the nickel dialkyldithiocarbamate is molded and vulcanized, and this enables the composition to exhibit the tensile characteristics at low temperature and the fatigue resistance suitable as materials for joint boots. To obtain further appropriate vulcanizing characteristics and fatigue resistance, it is preferred that the composition comprises 100 parts by weight of the chlorosulfonated ethylene-α-olefin copolymer, from 0.1 to 2 parts by weight of the thiuram compound, from 1 to 3 parts by weight of the bismaleimide compound, and from 0.3 to 4 parts by weight of the nickel dialkyldithiocarbamate.

Further, when the alkylnaphthalene condensate wherein the alkyl chain has at least two carbon atoms described above is added to the composition, the fatigue resistance can be further improved. The amount of the alkylnaphthalene condensate added is from 1 to 20 parts by weight per 100 parts by weight of the chlorosulfonated ethylene-α-olefin copolymer for sufficiently attaining the effects and maintaining the hardness and the modulus of the vulcanized products, and is more preferably from 3 to 10 parts by weight for obtaining appropriate vulcanization properties and fatigue resistance.

The chlorine content in the chlorosulfonated ethylene-α-olefin copolymer in the composition of the present invention is from 20 to 30% by weight. This is because since the density of the ethylene-α-olefin copolymer as the raw material of the composition of the present invention is 0.88 g/cc or less, the rubber elasticity can be developed with a relatively small amount of the chlorine introduced. It is effective for improving the tensile characteristics at low temperature and the fatigue resistance that the amount of chlorine introduced can be decreased without decreasing the rubber elasticity. Therefore, the composition of the present invention is suitable as not only the materials for joint boots but also the materials for dynamic uses such as various kinds of belts and air springs. Furthermore, for further improving the oil resistance, the tensile characteristics at room temperature and low temperature, and the good compression set under a low-temperature atmosphere suitable for joint boots, the chlorine content in the chlorosulfonated ethylene-α-olefin composition is preferably from 25 to 28% by weight. Also, the amount of sulfur in the chlorosulfonated ethylene-α-olefin copolymer is the measure of the amount of a chlorosulfone group which becomes the crosslinking point of the chlorosulfonated ethylene-α-olefin copolymer. The sulfur content capable of obtaining vulcanized products suitable for practical uses is from 0.3 to 2.0% by weight, and is preferably from 0.4 to 1.5% by weight for obtaining appropriate vulcanizing properties and fatigue resistance.

The vulcanized rubber obtained by molding and vulcanizing the chlorosulfonated ethylene-α-olefin copolymer composition of the present invention has the excellent tensile characteristics at room temperature and low temperature and also the excellent compression set under a low-temperature atmosphere and fatigue resistance, and therefore is suitably used for dynamic uses such as various kinds of belts, air springs, etc., requiring the dynamic fatigue resistance and the low-temperature resistance, and in particular for the joint boots of motorcars.

The present invention is described in more detail by referring to the following examples, but the invention is not limited thereto.

Values used in these examples are based on the following measurement methods.

[Density]: JIS K 7112

[Chlorine Content, Sulfur Content]: Combustion flask method

[Mooney Viscosity]: JIS K 6300

[Vulcanized Rubber Property]: JIS K 6301

Figure 1:
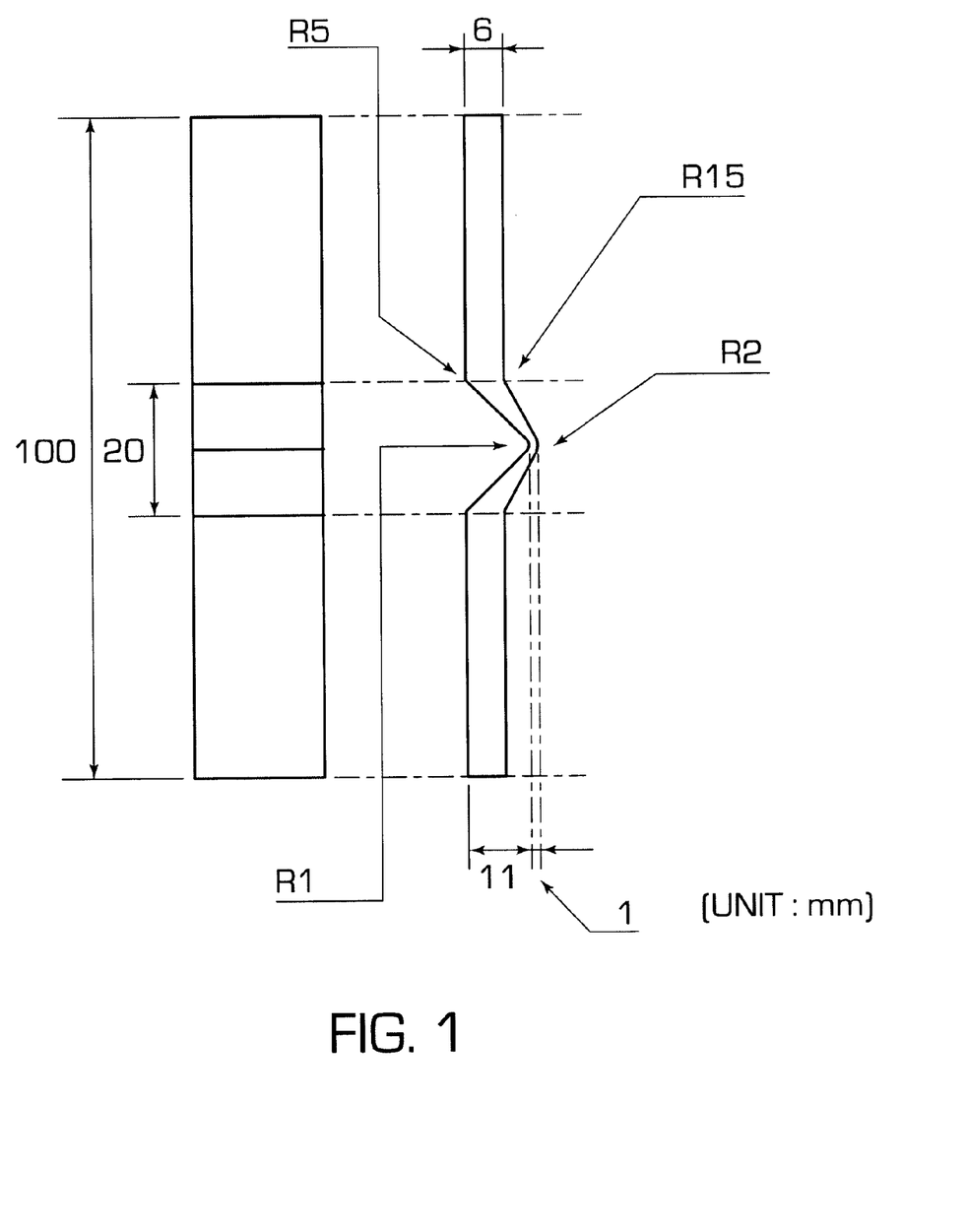
FIG. 1 is a view showing a vulcanized rubber test piece for evaluation used in the example.

[Fatigue Test Under Normal Temperature Atmosphere]:

The vulcanized rubber test piece for evaluation shown in FIG. 1 was prepared by press-molding and vulcanizing each chlorosulfonated ethylene-α-olefin copolymer composition. A DeMattia flexing machine was used as the test machine for the evaluation. The vulcanized rubber test piece was mounted on the test machine in the state that the distance between clamps was 50 mm, and by reciprocating the test piece in the distance of from 30 mm to 70 mm between the clamps, the test piece held by the clamps was bent and elongated. The reciprocation was operated at 600 times per minute under the condition of 25° C. The number of bending times until the test piece was broken was counted by a counter equipped to the test machine for counting the number of times, and the fatiguing property of the test piece under a normal-temperature atmosphere was evaluated by the number of the bending times. In addition, in the number of times, one reciprocating motion was counted once.

[Fatiguing Property Test Under Low-Temperature Atmosphere]

The fatiguing property test was carried out using the same test piece and the same evaluation test machine as the fatiguing test under a normal-temperature atmosphere under the same conditions about the mounting method of the test piece and the distance between the clamps.

The test was carried out under the atmosphere of −40° C., the test piece was mounted to the test machine, and after allowing to stand for 10 minutes, the test machine was operated for 10 seconds at 100 times per minute. The allowing to stand for 10 minutes and the operation for 10 seconds were repeated as one cycle and the fatiguing property was evaluated by the cycle number until the test piece was broken.

EXAMPLE 1

A chlorosulfonated ethylene-α-olefin copolymer having a chlorine content of 30%, a sulfur content of 0.5%, and a Mooney viscosity of 82, synthesized using an ethylene-butene-1 copolymer having a density of 0.90 as the raw material was used. The copolymer was kneaded according to the formulation of adding 3 parts by weight of octylated diphenylamine as shown in Table 1 below by a 10 inch open mixing mill.

The kneaded mixture was then press-vulcanized at 170° C. for 10 minutes to prepare a vulcanized product. The properties of the vulcanized product were evaluated.

The results obtained are shown in Table 2 below.

The results showed that the vulcanized product obtained had the excellent tensile characteristics at room temperature and low temperature and the excellent fatigue resistance at room temperature and −40° C.

In Table 1 shown below, the numerals are parts by weight.

TABLE 1

|     | Ex1 | Ex2 | Ex3 | Ex4 | Ex5 | Ex6 | Ex7 | Ex8 | Ex9 |
|-----|-----|-----|-----|-----|-----|-----|-----|-----|-----|
| (A) | 100 | 100 | 100 | 100 | 100 | 100 | 100 | 100 | 100 |
| (B) | —   | —   | —   | —   | —   | —   | —   | —   | —   |
| (C) | 5   | 5   | 5   | 5   | 5   | 5   | 5   | 5   | 5   |
| (D) | 5   | 5   | 5   | 5   | 5   | 5   | 5   | 5   | 5   |
| (E) | 1   | 1   | 1   | 1   | 1   | 1   | 1   | 1   | 1   |
| (F) | 2   | 2   | 2   | 2   | 2   | 2   | 2   | 2   | 2   |
| (G) | 70  | 70  | 70  | 70  | 70  | 70  | 70  | 70  | 70  |
| (H) | 30  | 30  | 30  | 30  | 30  | 30  | 30  | 30  | 30  |
| (I) | 0.3 | 0.3 | 0.3 | 0.3 | 0.3 | 0.3 | 1   | 0.3 | 0.3 |
| (J) | 1   | 1   | 1   | 1   | 1   | 1   | 1   | 2   | 1   |
| (K) | 3   | 3   | 3   | 3   | 3   | 3   | 3   | 3   | 1   |
| (L) | 3   | 5   | —   | —   | 5   | 5   | 3   | 3   | 3   |
| (M) | —   | —   | 3   | —   | —   | —   | —   | —   | —   |
| (N) | —   | —   | —   | 3   | —   | —   | —   | —   | —   |
| (O) | —   | —   | —   | —   | 5   | 10  | —   | —   | —   |

In the above table;
Ex: Example
(A): Chlorosulfonated ethylene-α-olefin copolymer 1: Synthesized using an ethylene-butene-1 copolymer having a density of 0.9 (chlorine content 30%, sulfur content 0.5%, Mooney viscosity 82) as the raw material.
(B): Chlorosulfonated ethylene-α-olefin copolymer 2: Synthesized using an ethylene-butene-1 copolymer having a density of 0.92 (chlorine content 30%, sulfur content 0.5%, Mooney viscosity 96) as the raw material.
(C): Magnesium oxide ("KYOWAMAG", made by Kyowa Kagaku Kogyo K.K.
(D): Calcium hydroxide ("CALBIT", made by Ohmi Kagaku Kogyo K.K.)
(E): EMASTER 510P (made by Riken Vitamin K.K.)
(F): Specific wax ("SUNNOO N", made by Ohuchi Shinko Kagaku Kogyo K.K.)
(G): Carbon FEF ("SEAST SO", made by Tohkai Carbon Kogyo K.K.)
(H): Plasticizer ("SANSOSIZER DOS", made by Shin Nihon Rika K.K.)
(I): NOCCELER IMR: Dipentamethylenethiuram tetrasulfide (made by Ohuchi Shinko Kagaku Kogyo K.K.)
(J): VULNOC PM: N,N'-m-Phenylenebismaleimide (made by Ohuchi Shinko Kagaku Kogyo K.K.)
(K): NOCRAC NBC: Nickel dibutyldithiocarbamate (made by Ohuchi Shinko Kagaku Kogyo K.K.)
(L): NOCRAC AD: Octylated diphenylamine (made by Ohuchi Shinko Kagaku Kogyo K.K.)
(M): NOCRAC CD: 4,4'-(α,α-Dimethylbenzyldiphenylamine (made by Ohuchi Shinko Kagaku Kogyo K.K.)
(N): NOCRAC PA: Phenyl-α-naphthylamine (made by Ohuchi Shinko Kagaku Kogyo K.K.)
(O): STRUKTOL 40MS-F: Alkylnaphthalene resin mixture (made by Struktol Co.)

TABLE 2

|     | Ex1 | Ex2 | Ex3 | Ex4 | Ex5 | Ex6 | Ex7 | Ex8 | Ex9 |
|-----|-----|-----|-----|-----|-----|-----|-----|-----|-----|
| (a) |     |     |     |     |     |     |     |     |     |
| a-1 | 69  | 69  | 69  | 68  | 67  | 66  | 69  | 71  | 72  |
| a-2 | 370 | 370 | 390 | 380 | 390 | 530 | 390 | 310 | 360 |
| a-3 | 14.4| 14.3| 14.8| 15.0| 14.8| 14.0| 14.8| 15.3| 15.5|
| a-4 | 3.7 | 3.5 | 3.6 | 3.6 | 3.3 | 2.4 | 3.2 | 5.1 | 4.2 |
| (b) |     |     |     |     |     |     |     |     |     |
| b-1 | 220 | 230 | 240 | 240 | 250 | 290 | 240 | 200 | 210 |
| b-2 | 23.0| 22.7| 23.9| 24.1| 23.3| 21.3| 23.8| 24.5| 23.5|
| b-3 | 13.0| 12.6| 13.1| 12.9| 12.3| 11.1| 11.8| 14.7| 13.6|
| (c) | 64  | 66  | 65  | 66  | 67  | 69  | 67  | 66  | 65  |
| (d) |     |     |     |     |     |     |     |     |     |
| d-1 | 380 | 550 | 440 | 370 | 840 | 1700| 400 | 350 | 340 |
| d-2 | 5   | 6   | 5   | 5   | 6   | 7   | 5   | 4   | 4   |

In the above table;
Ex: Example
(a): Tensile characteristics (room temperature)
a-1: Hardness (JIS-A)
a-2: Breaking elongation (%)
a-3: Breaking strength (MPa)
a-4: 100% Modulus (MPa)
(b): Tensile characteristics (−40° C.)
b-1: Breaking elongation (%)
b-2: Breaking strength (MPa)
b-3: 100% Modulus (MPa)
(c): Compression set (−20° C., 22 hours) (%)
(d): Fatiguing property
d-1: Normal-temperature atmosphere (times)
d-2: −40° C. Atmosphere (cycles)

EXAMPLE 2

The same kneading and vulcanization as in Example 1 were conducted except that the amount of octylated diphenylamine added was changed to 5 parts by weight to obtain a vulcanized product. The properties of the product were evaluated. The results obtained are shown in Table 2 above.

The results showed that the product had excellent tensile characteristics at room temperature and at low temperature and also excellent fatigue resistance at room temperature and at −40° C.

EXAMPLE 3

The same kneading and vulcanization as in Example 1 were conducted except that 4,4'-(α,α-dimethylbenzyldiphenylamine) was used in place of octylated diphenylamine to obtain a vulcanized product. The properties of the product were evaluated. The results obtained are shown in Table 2 above.

The results showed that the product had excellent tensile characteristics at room temperature and at low temperature and also excellent fatigue resistance at room temperature and at −40° C.

EXAMPLE 4

The same kneading and vulcanization as in Example 1 were conducted except that phenyl-α-naphthylamine was used in place of octylated diphenylamine to obtain a vulcanized product. The properties of the product were evaluated. The results obtained are shown in Table 2 above.

The results showed that the product had excellent tensile characteristics at room temperature and at low temperature and also excellent fatigue resistance at room temperature and at −40° C.

EXAMPLE 5

The same kneading and vulcanization as in Example 1 were conducted except that 5 parts by weight of a diethylnaphthalene condensate was further added to obtain a vulcanized product. The properties of the product were evaluated. The results obtained are shown in Table 2 above.

The results showed that the product had excellent tensile characteristics at room temperature and at low temperature and also excellent fatigue resistance at room temperature and at −40° C.

EXAMPLE 6

The same kneading and vulcanization as in Example 5 were conducted except that the amount of the diethylnaphthalene condensate added was changed to 10 parts by weight to obtain a vulcanized product. The properties of the product were evaluated. The results obtained are shown in Table 2 above.

The results showed that the product had excellent tensile characteristics at room temperature and at low temperature and also excellent fatigue resistance at room temperature and at −40° C.

EXAMPLE 7

The same kneading and vulcanization as in Example 1 were conducted except that the amount of dipentamethylenethiuram tetrasulfide added was changed to 1 part by weight to obtain a vulcanized product. The properties of the product were evaluated. The results obtained are shown in Table 2 above.

The results showed that the product had excellent tensile characteristics at room temperature and at low temperature and also excellent fatigue resistance at room temperature and at −40° C.

EXAMPLE 8

The same kneading and vulcanization as in Example 1 were conducted except that the amount of N,N'-m-phenylenebismaleimide added was changed to 2 part by weight to obtain a vulcanized product. The properties of the product were evaluated. The results obtained are shown in Table 2 above.

The results showed that the product had excellent tensile characteristics at room temperature and at low temperature and also excellent fatigue resistance at room temperature and at −40° C.

EXAMPLE 9

The same kneading and vulcanization as in Example 1 were conducted except that the amount of nickel dibutyldithiocarbamate added was changed to 1 part by weight to obtain a vulcanized product. The properties of the product were evaluated. The results obtained are shown in Table 2 above.

The results showed that the product had excellent tensile characteristics at room temperature and at low temperature and also excellent fatigue resistance at room temperature and at −40° C.

COMPARATIVE EXAMPLE 1

The same kneading and vulcanization as in Example 1 were conducted except that octylated diphenylamine was not added to obtain a vulcanized product. The properties of the product were evaluated. The formulation is shown in Table 3 below and the results obtained are shown in Table 4 below.

The results showed that the product was poor in the elongation at room temperature and low temperature and in the fatigue resistance at normal temperature and at −40° C.

In following Table 3, the numerals are parts by weight.

TABLE 3

|     | Ex10 | Ex11 | CE1 | CE2 | CE3 | CE4 | CE5 | CE6 | CE7 |
|-----|------|------|-----|-----|-----|-----|-----|-----|-----|
| (A) | —    | 2    | 100 | 100 | 100 | 100 | 100 | —   | —   |
| (B) | 100  | 100  | —   | —   | —   | —   | —   | 100 | 100 |
| (C) | 5    | 5    | 5   | 5   | 5   | 5   | 5   | 5   | 5   |
| (D) | 5    | 5    | 5   | 5   | 5   | 5   | 5   | 5   | 5   |
| (E) | 1    | 1    | 1   | 1   | 1   | 1   | 1   | 1   | 1   |
| (F) | 2    | 2    | 2   | 2   | 2   | 2   | 2   | 2   | 2   |
| (G) | 70   | 70   | 70  | 70  | 70  | 70  | 70  | 70  | 70  |
| (H) | 30   | 30   | 30  | 30  | 30  | 30  | 30  | 30  | 30  |
| (I) | 0.3  | 0.3  | 0.3 | 0.3 | —   | 0.3 | 0.3 | 0.3 | 0.3 |
| (J) | 1    | 1    | 1   | 0.7 | 1   | 6   | 3   | 1   | 1   |
| (K) | 3    | 3    | 3   | 3   | 3   | 3   | 6   | 3   | 3   |
| (L) | 3    | 3    | —   | —   | 3   | 3   | 3   | —   | —   |
| (M) | —    | —    | —   | —   | —   | —   | —   | —   | —   |
| (N) | —    | —    | —   | —   | —   | —   | —   | —   | —   |
| (O) | —    | 5    | —   | —   | —   | —   | —   | —   | 5   |

In the above table;
Ex: Example;
CE: Comparative Example
Other abbreviations are the same as those in Table 1.

TABLE 4

|     | Ex10 | Ex11 | CE1 | CE2 | CE3 | CE4 | CE5 | CE6 | CE7 |
|-----|------|------|-----|-----|-----|-----|-----|-----|-----|
| (a) |      |      |     |     |     |     |     |     |     |
| a-1 | 67   | 68   | 70  | 68  | 70  | 72  | 71  | 70  | 70  |
| a-2 | 320  | 390  | 270 | 370 | 230 | 200 | 180 | 270 | 320 |
| a-3 | 14.5 | 16.4 | 16.3| 13.6| 17.2| 15.8| 16.5| 18.9| 17.9|
| a-4 | 4.3  | 3.4  | 4.9 | 3.3 | 5.3 | 5.7 | 5.5 | 5.1 | 4.4 |
| (b) |      |      |     |     |     |     |     |     |     |
| b-1 | 220  | 250  | 170 | 180 | 150 | 130 | 100 | 180 | 220 |
| b-2 | 26.2 | 27.0 | 26.8| 23.3| 27.1| 26.5| 26.7| 29.2| 26.4|
| b-3 | 18.1 | 16.4 | 20.5| 16.4| 21.3| 21.8| 21.5| 21.0| 18.1|
| (c) | 83   | 85   | 66  | 68  | 66  | 65  | 65  | 83  | 83  |
| (d) |      |      |     |     |     |     |     |     |     |
| d-1 | 310  | 510  | 210 | 250 | 180 | 140 | 100 | 150 | 430 |
| d-2 | 4    | 5    | 2   | 2   | 1   | 0   | 0   | 1   | 2   |

In the above table;
Ex: Example;
CE: Comparative Example
Other abbreviations are the same as those in Table 2.

COMPARATIVE EXAMPLE 2

The same kneading and vulcanization as in Comparative Example 1 were conducted except that the amount of N,N'-m-phenylenebismaleimide added was changed to 0.7 part by weight to obtain a vulcanized product. The properties of the product were evaluated. The results obtained are shown in Table 4 above.

The results showed that the product was poor in the elongation at low temperature and in the fatigue resistance at normal temperature and at −40° C.

COMPARATIVE EXAMPLE 3

The same kneading and vulcanization as in Example 1 were conducted except that dipentamethylenethiuram tetrasulfide was not added to obtain a vulcanized product. The properties of the product were evaluated. The results obtained are shown in Table 4 above.

The results showed that the product was poor in the elongation at room temperature and low temperature and in the fatigue resistance at normal temperature and at −40° C.

COMPARATIVE EXAMPLE 4

The same kneading and vulcanization as in Example 1 were conducted except that the amount of N,N'-m-phenylenebismaleimide added was change to 6 parts by weight to obtain a vulcanized product. The properties of the product were evaluated. The results obtained are shown in Table 4 above.

The results showed that the product was poor in the elongation at room temperature and low temperature and in the fatigue resistance at normal temperature and at −40° C.

COMPARATIVE EXAMPLE 5

The same kneading and vulcanization as in Example 1 were conducted except that the amount of N,N'-m-phenylenebismaleimide added was changed to 3 parts by weight and the amount of nickel dibutyldithiocarbamate added was changed to 6 parts by weight to obtain a vulcanized product. The properties of the product were evaluated. The results obtained are shown in Table 4 above.

The results showed that the product was poor in the elongation at room temperature and low temperature and in the fatigue resistance at normal temperature and at −40° C.

EXAMPLE 10

A chlorosulfonated ethylene-α-olefin copolymer having a chlorine content of 30%, a sulfur content of 0.5%, and a Mooney viscosity of 92 synthesized using an ethylene-butene-1 copolymer having a density of 0.92 as the raw material was used. The copolymer was kneaded according to the formulation of adding 3 parts by weight of octylated diphenylamine as shown in Table 3 above by a 10 inch open mixing mill.

The kneaded mixture was then press-vulcanized at 170° C. for 10 minutes to obtain a vulcanized product. The properties of the vulcanized product were evaluated.

The results obtained are shown in Table 4 above.

The results showed that the vulcanized product obtained had excellent tensile characteristics at room temperature and low temperature and also excellent fatigue resistance at room temperature and at −40° C.

EXAMPLE 11

The same kneading and vulcanization as Example 10 were conducted except that 5 parts by weight of a diethyl-naphthalene condensate was further added to obtain a vulcanized product. The properties of the product were evaluated. The results obtained are shown in Table 4 above.

The results showed that the product had excellent tensile characteristics at room temperature and at low temperature and also excellent fatigue resistance at room temperature and at −40° C.

COMPARATIVE EXAMPLE 6

The same kneading and vulcanization as in Example 10 were conducted except that octylated diphenylamine was not added to obtain a vulcanized product. The properties of the product were evaluated. The results obtained are shown in Table 4 above.

The results showed that the product was poor in the elongation at low temperature and in the fatigue resistance at normal temperature and at −40° C.

COMPARATIVE EXAMPLE 7

The same kneading and vulcanization as in Example 11 were conducted except that octylated diphenylamine was not added to obtain a vulcanized product. The properties of the product were evaluated. The results obtained are shown in Table 4 above.

The results showed that the product was poor in the fatigue resistance at −40° C.

EXAMPLE 12

A chlorosulfonated ethylene-α-olefin copolymer having a chlorine content of 23%, a sulfur content of 0.5%, and a Mooney viscosity of 80 synthesized using a ethylene-propylene copolymer having a density of 0.87 as the raw material was used as a copolymer. The copolymer was kneaded according to the formulation as shown in Table 5 below by a 10 inch open mixing mill.

The kneaded mixture was then press-vulcanized at 170° C. for 10 minutes to obtain a vulcanized product. The properties of the vulcanized product were evaluated.

The results obtained are shown in Table 5 below.

The results showed that the vulcanized product obtained had excellent tensile characteristics at room temperature and low temperature, excellent compression set under a low-temperature atmosphere, and excellent fatigue resistance at room temperature and at −40° C.

In the following table, the numerals are by weight.

TABLE 5

| | |
|---|---|
| Chlorosulfonated ethylene-α-olefin Copolymer 3 | 100 |
| Magnesium Oxide ("KYOWAMAG", made by Kyowa Kagaku Kogyo K.K.) | 5 |
| Calcium Hydroxide ("CALBIT", made by Ohmi Kagaku Kogyo K.K.) | 5 |
| EMASTER 510P (made by Riken vitamin K.K.) | 1 |
| Specific Wax ("SUNNOO N", made by Ohuchi Shinko Kagaku Kogyo K.K.) | 2 |
| Carbon FEF ("SEAST SO", made by Tohkai Carbon Kogyo K.K.) | 70 |
| Plasticizer ("SANSOSIZER DOS", made by Shin Nihon Rika K.K.) | 30 |
| NOCCELER TRA*1 | 0.3 |
| VOLNOC PM*2 | 1 |
| NOCRAC NBC*3 | 3 |

*1Dipentamethylenethiuram tetrasulfide (made by Ohuchi Shinko Kagaku Kogyo K.K.)
*2N,N'-m-phenylenebismaleimide (made by Ohuchi Shinko Kagaku Kogyo K.K.)
*3Nickel dibutyldithiocarbamate (made by Ohuchi Shinko Kagaku Kogyo K.K.)

TABLE 6

| | Ex12 | Ex13 | Ex14 | CE8 | CE9 | CE10 |
|---|---|---|---|---|---|---|
| (p) | 0.87 | 0.87 | 0.87 | 0.87 | 0.90 | 0.90 |
| (q) | 23 | 26 | 29 | 34 | 26 | 30 |
| (r) | 0.5 | 0.5 | 0.5 | 0.5 | 0.5 | 0.5 |
| (s) | 80 | 82 | 88 | 92 | 80 | 82 |
| (a) | | | | | | |
| a-1 | 68 | 67 | 67 | 70 | 67 | 70 |
| a-2 | 300 | 280 | 280 | 260 | 280 | 270 |
| a-3 | 16.7 | 18.0 | 19.0 | 21.1 | 17.7 | 16.3 |
| a-4 | 4.2 | 4.2 | 4.5 | 5.5 | 4.3 | 4.9 |
| (b) | | | | | | |
| b-1 | 260 | 250 | 250 | 170 | 270 | 170 |
| b-2 | 28.2 | 26.1 | 31.1 | 33.5 | 29.0 | 26.8 |
| b-3 | 9.2 | 8.9 | 9.1 | 11.2 | 14.8 | 20.5 |
| (c) | 45 | 28 | 28 | 31 | 80 | 66 |
| (d) | | | | | | |
| d-1 | 380 | 310 | 320 | 220 | 230 | 210 |
| d-2 | >10 | >10 | >10 | 2 | 4 | 2 |
| (e) | | | | | | |
| $T_2$(° C.) | −30.5 | −32.5 | −31.4 | −10.7 | −11.7 | −22.6 |
| $T_5$(° C.) | −47.2 | −46.0 | −42.4 | −32.8 | −37.2 | −40.8 |
| $T_{10}$(° C.) | −51.7 | −49.6 | −47.1 | −40.4 | −45.5 | −46.1 |
| $T_{100}$(° C.) | −61.6 | −58.2 | −56.9 | −51.5 | −57.5 | −55.0 |

In the above table;
Ex: Example,
CE: Comparative Example
(p): Density of raw material, ethylene-α-olefin composition (g/cc).
(q): Chlorine content in the raw material (%).
(r): Sulfur content in the raw material (%).
(s): Mooney viscosity of the raw material.
(a): Tensile characteristics (room temperature)
a-1: Hardness (JIS-A)
a-2: Breaking elongation (%)
a-3: Breaking strength (MPa)
a-4: 100% Modulus (MPa)
(b): Tensile characteristics (−40° C.)
b-1: Breaking elongation (MPa)
b-2: Breaking strength (MPa)
b-3: 100% Modulus (MPa)
(c): Compression set (−20° C., 22 hours) (%)
(d): Fatiguing property
d-1: Normal-temperature atmosphere (times)
d-2: −4° C. Atmosphere (cycles)
(e): Gehman torsion test

EXAMPLE 13

The same test as in Example 12 was carried out except that a chlorosulfonated ethylene-α-olefin copolymer having a chlorine content of 26%, a sulfur content of 0.5%, and a Mooney viscosity of 82 was used as the polymer. The results obtained were shown in Table 6 above.

The results showed that the product had excellent tensile characteristics at room temperature and low temperature, good compression set under a low-temperature atmosphere, and excellent fatigue resistance at room temperature and at −40° C.

EXAMPLE 14

The same test as in Example 12 was carried out except that a chlorosulfonated ethylene-α-olefin copolymer having a chlorine content of 29%, a sulfur content of 0.5%, and a Mooney viscosity of 88 was used as the polymer. The results obtained were shown in Table 6 above.

The results showed that the product had excellent tensile characteristics at room temperature and low temperature, good compression set under a low-temperature atmosphere, and excellent fatigue resistance at room temperature and at −40° C.

COMPARATIVE EXAMPLE 8

A chlorosulfonated ethylene-α-olefin copolymer having a chlorine content of 34%, a sulfur content of 0.5%, and a Mooney viscosity of 92 synthesized using an ethylene-propylene copolymer having a density of 0.87 as the raw material was used as the polymer. The resulting mixture was kneaded according to the formulation shown in Table 5 above by a 10 inch open mill. The kneaded mixture was then press-vulcanized at 170° C. for 10 minutes to obtain a vulcanized product. The properties of the product were evaluated. The results obtained are shown in Table 6 above.

The results showed that the product was poor in the elongation at low temperature, the fatigue resistance at normal temperature and at −40° C., and also in the low-temperature characteristics by the Gehman torsion test in spite of the same polyolefin having a low density as the raw material as in Example 12.

COMPARATIVE EXAMPLE 9

A chlorosulfonated ethylene-α-olefin copolymer having a chlorine content of 26%, a sulfur content of 0.5%, and a Mooney viscosity of 80 synthesized using an ethylene-butene-1 copolymer having a density of 0.90 as the raw material was used as the polymer. The resulting mixture was kneaded according to the formulation shown in Table 5 above by a 10 inch open mill. The kneaded mixture was then press-vulcanized at 170° C. for 10 minutes to obtain a vulcanized product. The properties of the product were evaluated. The results obtained are shown in Table 6 above.

The results showed that the product was poor in the elongation at low temperature, in the fatigue resistance at normal temperature and at −40° C., and also in the low-temperature characteristics by the Gehman torsion test in spite of the same chlorine content as in Example 13.

COMPARATIVE EXAMPLE 10

The same test as in Comparative Example 9 was carried out except that a chlorosulfonated ethylene-α-olefin copolymer having a chlorine content of 30%, a sulfur content of 0.5%, and a Mooney viscosity of 82 was used as the polymer. The results obtained are shown in Table 6 above.

The results showed that the product was poor in the elongation at low temperature, in the fatigue resistance at normal temperature and at −40° C., and in the low-temperature characteristics by the Gehman torsion test.

As described above, it is clear that the compositions of the present invention are excellent in the tensile characteristics at room temperature and low temperature, in the compression set under a low-temperature atmosphere, and in the fatigue resistance at room temperature and at −40° C. By molding and vulcanizing the compositions of the present invention, the materials obtained are suitable as joint boots of motorcars and further for dynamic uses such as various kinds of belts, air springs, etc.

While the invention has been described in detail and with reference to specific embodiments thereof, it will be apparent to one skilled in the art that various changes and modifications can be made therein without departing from the spirit and scope thereof.

What is claimed is:

1. A joint boot comprising a product obtained by molding and vulcanizing a chlorosulfonated ethylene-α-olefin copolymer composition comprising 100 parts by weight of a chlorosulfonated ethylene-α-olefin copolymer;

from 0.05 to 3 parts by weight of a thiuram compound;

from 0.5 to 5 parts by weight of a bismaleimide compound;

from 0.1 to 5 parts by weight of a nickel dialkyldithiocarbamate; and from 0.5 to 10 parts by weight of a diarylmonoamine compound.

2. The joint boot as claimed in claim 1, wherein the chlorosulfonated ethylene-α-olefin copolymer composition further comprises from 1 to 20 parts by weight of an alkylnaphthalene condensate wherein the alkyl chain has at least two carbon atoms.

3. The joint boot as claimed in claim 1, wherein the ethylene-α-olefin copolymer is selected from the group consisting of an ethylene-butene-1 copolymer, an ethylene-propylene copolymer, and an ethylene-hexene-1 copolymer.

4. The joint boot as claimed in claim 1, wherein the chlorosulfonated ethylene-α-olefin copolymer has a chlorine content of from 20 to 35% by weight and a sulfur content of from 0.3 to 2.0% by weight.

5. The joint boot as claimed in claim 1, wherein the thiuram compound is dipentamethylenethiuram tetrasulfide.

6. The joint boot as claimed in claim 1, wherein the bismaleimide compound is N,N'-m-phenylenebismaleimide.

7. The joint boot as claimed in claim 1, wherein the nickel dialkyldithiocarbamate is nickel dibutyldithiocarbamate.

8. The joint boot as claimed in claim 1, wherein the diarylmonoamine compound is selected from the group consisting of phenyl-α-naphthylamine, 4,4'-(α,α-dimethylbenzyldiphenylamine), and octylated diphenylamine.

9. The joint boot as claimed in claim 2, wherein the alkylnaphthalene condensate wherein the alkyl chain has at least two carbon atoms is a diethylnaphthalene condensate.

10. A joint boot comprising a product obtained by molding and vulcanizing a chlorosulfonated ethylene-α-olefin copolymer composition comprising 100 parts by weight of a chlorosulfonated ethylene-α-olefin copolymer having a chlorine content of from 20 to 30% by weight and a sulfur content of from 0.3 to 2.0% by weight obtained by chlorosulfonating an ethylene-α-olefin copolymer having a density of 0.88 g/cc or less;

from 0.05 to 3 parts by weight of a thiuram compound;

from 0.5 to 5 parts by weight of a bismaleimide compound; and from 0.1 to 5 parts by weight of a nickel dialkyldithiocarbamate.

11. The joint boot as claimed in claim 10, wherein the ethylene-α-olefin copolymer is selected from the group consisting of an ethylene-butene-1 copolymer, an ethylene-propylene copolymer, and an ethylene-hexene-1 copolymer.

12. The joint boot as claimed in claim 10, wherein the thiuram compound is dipentamethylenethiuram tetrasulfide.

13. The joint boot as claimed in claim 10, wherein the bismaleimide compound is N,N'-m-phenylenebismaleimide.

14. The joint boot as claimed in claim 10, wherein the nickel dialkyldithiocarbamate is nickel dibutyldithiocarbamate.

15. A joint boot comprising a product obtained by molding and vulcanizing a chlorosulfonated ethylene-α-olefin copolymer composition comprising 100 parts by weight of a chlorosulfonated ethylene-α-olefin copolymer having a chlorine content of from 20 to 30% by weight and a sulfur content of from 0.3 to 2.0% by weight obtained by chlorosulfonating an ethylene-α-olefin copolymer having a density of not higher than 0.88 g/cc, containing from 0.05 to 3 parts by weight of a thiuram compound, from 0.5 to 5 parts by weight of a bismaleimide compound, from 0.1 to 5 parts by weight of a nickel dialkyldithiocarbamate, and from 1 to 20 parts by weight of an alkylnaphthalene condensate wherein the alkyl chain has at least two carbon atoms.

16. The joint boot as claimed in claim 15, wherein the ethylene-α-olefin copolymer is selected from the group consisting of an ethylene-butene-1 copolymer, an ethylene-propylene copolymer, and an ethylene-hexene-1 copolymer.

17. The joint boot as claimed in claim 15, wherein the thiuram compound is dipentamethylenethiuram tetrasulfide.

18. The joint boot as claimed in claim 15, wherein the bismaleimide compound is N,N'-m-phenylenebismaleimide.

19. The joint boot as claimed in claim 15, wherein the nickel dialkyldithiocarbamate is nickel dibutyldithiocarbamate.

20. The joint boot as claimed in claim 15, wherein the alkylnaphthalene condensate wherein the alkyl chain has at least two carbon atoms is a diethylnaphthalene condensate.

* * * * *